Sept. 6, 1966   G. D. EVANS ETAL   3,271,046
BOGIE ACTION TORSION BAR SUSPENSION SYSTEM
Filed May 26, 1964   2 Sheets-Sheet 1

George D. Evans
Lawrence L. Mitchell,
INVENTORS.

BY Harry M. Saragovitz
Edward J. Kelly
Herbert Berl
James T. Deaton

Sept. 6, 1966   G. D. EVANS ETAL   3,271,046
BOGIE ACTION TORSION BAR SUSPENSION SYSTEM
Filed May 26, 1964   2 Sheets-Sheet 2

ROADSIDE

CURBSIDE

George D. Evans
Lawrence L. Mitchell,
   *INVENTORS.*

BY Harry M. Saragovitz
   Edward J. Kelly
   Herbert Berl
   James T. Deaton

United States Patent Office 3,271,046
Patented Sept. 6, 1966

3,271,046
BOGIE ACTION TORSION BAR
SUSPENSION SYSTEM
George D. Evans and Lawrence L. Mitchell, Salt Lake City, Utah, assignors, by mesne assignments, to the United States of America as represented by the Secretary of the Army
Filed May 26, 1964, Ser. No. 370,390
6 Claims. (Cl. 280—104.5)

This invention relates to a bogie action torsion bar suspension system for a vehicle having a frame.

In ground support semitrailer vehicles for transporting missile components, the need has arisen for a suspension system which can be installed in a semitrailer frame and which will allow the frame of the semitrailer to be much closer to road level than that of conventional suspension systems. This lowering of the frame is of great advantage in that for a vehicle with a tandem wheel arrangement which is attached to the vehicle structure by means of a system of levers, torsion bars and linkages, it will be possible to transport a larger cubage of payload on top of the trailer frame and still maintain sufficient ground clearance as required for good mobility.

Therefore, it is an object of this invention to provide a vehicle suspension system in which the design of the suspension system is such as to allow a vehicle frame, to which the suspension system is installed, to have low overall vehicle height and at the same time maximum road clearance.

Another object of this invention is to provide a suspension system which has bogie action built therein which allows the forward or rear wheel of a tandem set to pass over a six inch obstacle while the payload on top of the trailer rises only three inches, thus lowering the dynamic loading transferred from wheels to payload.

A further object of this invention is to achieve, for example, a six inch displacement of the forward or rear wheel without any additional windup of the torsion bars other than that caused by the static load.

A still further object of this invention is to provide a suspension system in which, after the wheel has traveled six inches as set forth above, an additional five inches of wheel travel can be obtained by torsion bar windup.

Other objects of this invention include making the torsion bars stiff to prevent this suspension system from bottoming out and impacting the trailer and payload under rugged road conditions, to distribute the payload more evenly among the tires on the semitrailer, due to the bogie action feature, and to provide a suspension system which is operable under extreme environmental conditions.

The needs set forth above have been satisfied by providing a bogie action torsion bar suspension system in which the roadside and curbside suspension components are arranged in a taggered array with the roadside and curbside components each being connected through a generally U-shaped linkage system including torsion bars.

In the accompanying drawing forming a part of this specification, and in which like numerals are employed to designate corresponding parts throughout the same:

Figure 1:
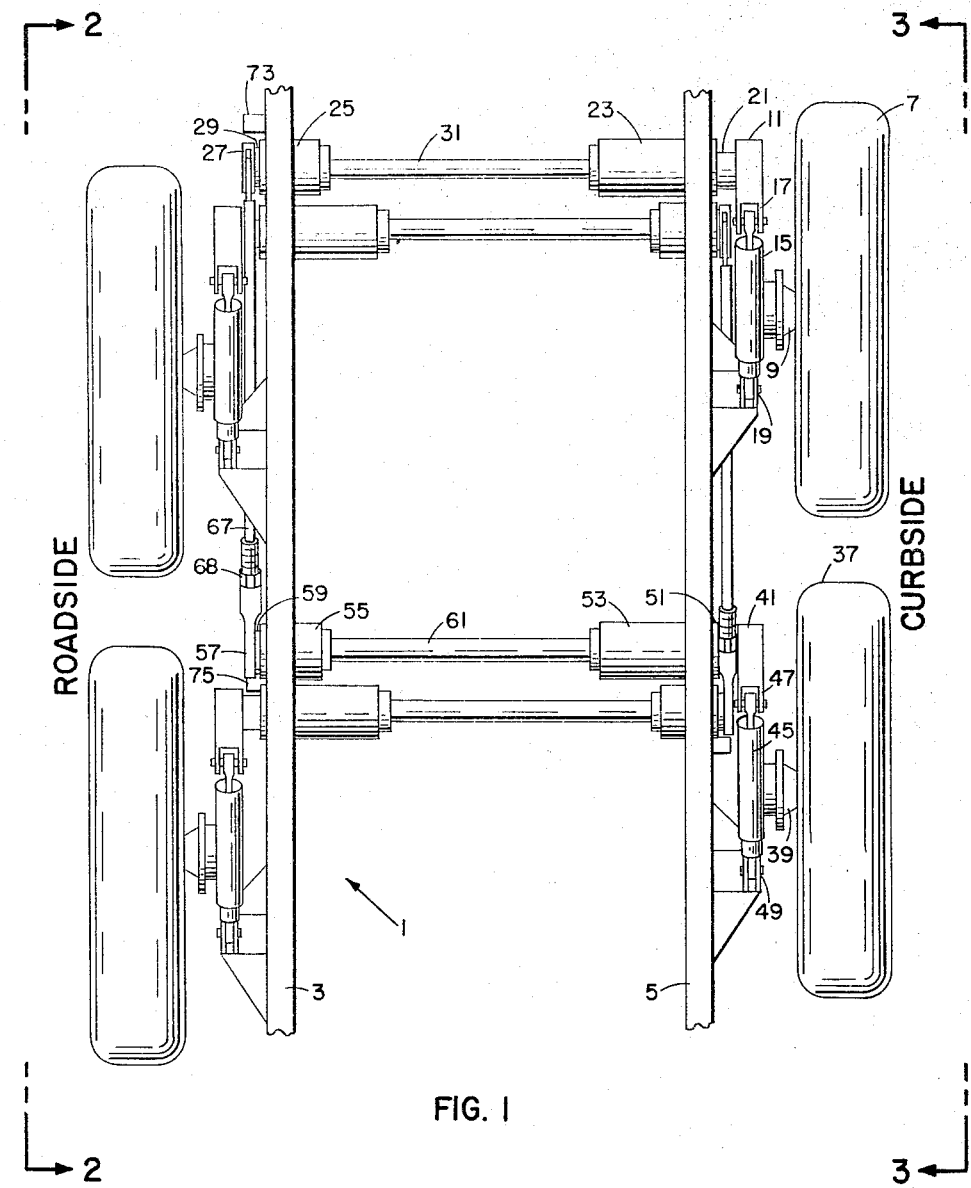
FIGURE 1 is a plan view looking down on a vehicle bogie action torsion bar suspension system.

This invention may be better understood by referring to the drawing wherein, numeral 1 designates a trailer frame which has a roadside 3 and a curbside 5.

Figure 2:
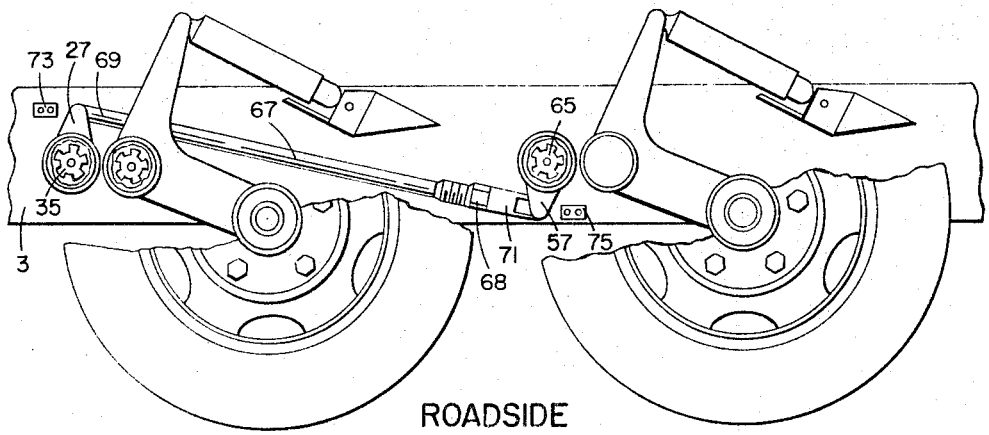
FIGURE 2 is a side plan view as viewed from line 2—2 of FIG. 1, with portions cutaway, of the vehicle bogie action torsion bar suspension system.
Figure 3:
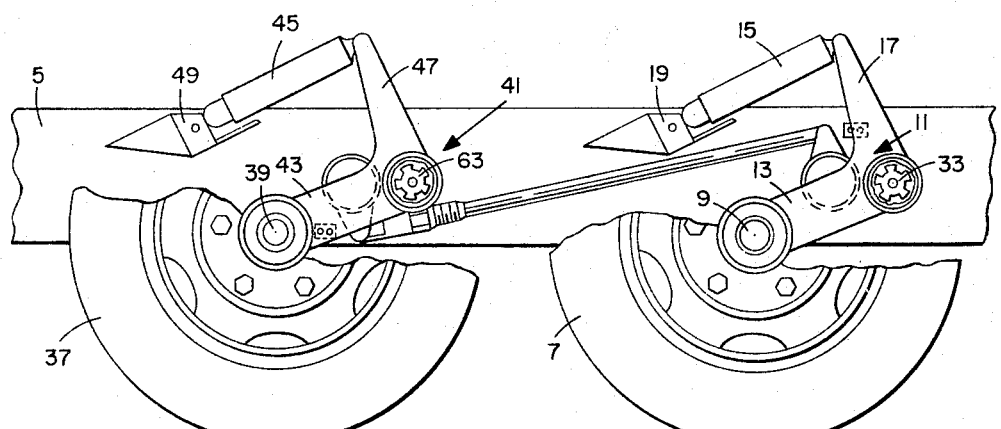
FIGURE 3 is a side plan view as viewed from line 3—3 of FIG. 1, with portions cutaway, of the vehicle bogie action torsion bar suspension system.

A curbside forward wheel suspension means includes a curbside forward wheel 7 which is attached to a standard spindle 9 which in turn is fastened to a trailing arm 11 at a bottom portion 13. A shock absorber 15 is connected at one end of a top portion 17 of the trailing arm 11 and at the other end to the trailer frame at 19. The trailing arm 11 also includes a trailing arm shaft 21 which is mounted in a conventional manner by means including two bearings housed within housing 23 which is an integral part of the trailer frame. Directly opposite housing 23, on the roadside of the frame, is the bogie arm housing 25 which is also an integral part of the trailer frame. A bogie arm 27 includes a bogie arm shaft 29 which is mounted in a conventional manner by means including two bearings housed within bogie arm housing 25. A torsion bar 31 is splined at one end 33 (see FIG. 3) to the trailing arm 11 and at the other end 35 (see FIG. 2) to the bogie arm 27 so as to be free floating.

A curbside rear wheel suspension means includes a curbside rear wheel 37 which is attached to a standard spindle 39 which in turn is fastened to a trailing arm 41 at a bottom portion 43. A shock absorber 45 is connected at one end to a top portion 47 of the trailing arm 41 and at the other end to the trailer frame at 49. The trailing arm 41 also includes a trailing arm shaft 51 which is mounted in a conventional manner by means including two bearings housed within housing 53 which is an integral part of the trailer frame. Directly opposite housing 53, on the roadside of the frame, is the bogie arm housing 55 which is also an integral part of the trailer frame. A bogie arm 57 includes a bogie arm shaft 59 which is mounted in a conventional manner by means including two bearings housed within bogie arm housing 55. A torsion bar 61 is splined at one end 63 (see FIG. 3). to the trailing arm 41 and at the other end 65 (see FIG. 2) to the bogie arm 57 so as to be free floating.

The curbside forward wheel means is connected to the curbside rear wheel means by an adjustable connecting link 67 which has one end 69 (see FIG. 2) connected to the upward projecting portion of bogie arm 27 and another end 71 connected to the downward projecting portion of bogie arm 57. With bogie arms 27 and 57 connected by connecting link 67, the curbside bogie action suspension system is complete except for adjustable stop 73 which coacts with bogie arm 27 to limit the movement of the curbside bogie action suspension system in one direction of movement, and adjustable stop 75 which coacts with bogie arm 57 to limit the movement of the curbside bogie action suspension system in the other direction of movement.

The roadside bogie action suspension system is identical to that of the curbside suspension system, and is not therefore described in detail. The roadside bogie action suspension system is staggered, for example, six inches behind the curbside suspension system. From a softer ride standpoint, this becomes a desirable feature since for a cross-road obstruction, the curbside wheel passes over the obstruction before the roadside wheel encounters it. This, in effect, causes the center of gravity of the payload on the trailer to be displaced only one half the amount it would be displaced if the wheels on both sides of the trailer were to pass over the obstruction at the same time.

In operation, the bogie action of this system allows a vertical differential between the forward and rear wheel, of the curbside or roadside suspension system, for example of say six inches before any additional torsion bar windup is encountered. As the forward wheel 7 of the curbside pair of wheels passes over a six inch obstacle (see FIG. 3), trailing arm 11 rotates clockwise, and since bogie arm 27 for the curbside is coupled to trailing arm 11 through torsion bar 31, bogie arm 27 also rotates clockwise, as viewed from curbside. This movement of bogie arm 27 is transmitted through connecting link 67 to bogie arm 57, torsion bar 61, trailing arm 41 and finally to rear wheel 37. This movement through connecting link 67 causes bogie arm 57 torsion bar 61 and trailing arm 41 to rotate counterlockwise and thus move rear wheel 37 down relative to the frame. The clockwise rotation of the forward trailing arm and the counterclockwise rotation of the rear trailing arm accounts for the six inch differential previously mentioned. As the rear wheel passes over the six inch obstacle, the identical action occurs only reversed. Even though the trailer has passed over a six inch obstacle, the payload has been raised only a maximum of three inches due to the bogie action linkage system utilized. As soon as the six inch differential has been reached, mechanical stops, such as 73 or 75 for the curbside, limit the travel of the bogie arms, and any additional deflection of a particular wheel results in torsion bar wind-up. The maximum additional deflection, for the particular example previously referred to herein, is five inches, thus making the total deflection of any one of the wheels a maximum of eleven inches.

The torsion bars of this system are made intentionally stiff so that under maximum loads encountered, the suspension system will not bottom-out and cause undesirable shock loads to pass into the payload. Another unique feature in the use of this suspension system is that it can be retracted, thus lowering the overall height of the trailer for aircraft or rail shipment. The wheels can be retracted by lengthening the adjustable connecting links, for example connecting link 67 and the connecting link for the roadside, which tie the bogie arms together. Each of the adjustable links are adjustable by a swivel nut, such as swivel nut 68 on connecting link 67, designed to be adjusted manually, or if desired, each of the adjustable links may be designed as a hydraulically operated link capable of being operated remotely, thus enabling ground clearance to be increased or decreased, as the occasion arises. The adjustable connecting links are also used as a means for adjusting the system due to sag in the torsion bars, which sag usually results over a period of time.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

We claim:

1. A bogie action torsion bar suspension system for a vehicle having a frame, said suspension system including: a roadside and a curbside bogie action suspension system mounted on said frame; said roadside and said curbside bogie action suspension system each including, a forward wheel and a rear wheel which are interconnected by a generally U-shaped linkage which extends from one side of said frame to the other and which includes at least one torsion bar as a part of said linkage, said linkage being arranged in such a manner as to have a bogie action built therein; and said curbside suspension system being mounted on said frame forward of said roadside suspension system.

2. A bogie action torsion bar suspension system as set forth in claim 1 wherein said linkage includes an adjustable connecting link which can be adjusted to adjust the height of the frame relative to the ground.

3. A bogie action torsion bar suspension system for a vehicle having a frame, said suspension system including: a curbside and a roadside suspension system; said curbside and said roadside suspension system each including; a forward trailing arm rotatably mounted on said frame, a forward bogie arm rotatably mounted on said frame directly opposite said forward trailing arm, a forward torsion bar connected between said forward trailing arm and said forward bogie arm, a rear trailing arm rotatably mounted on said frame, a rear bogie arm rotatably mounted on said frame directly opposite said rear trailing arm, a rear torsion bar connected between said rear trailing arm and said rear bogie arm, and an adjustable connecting link connected at one end to a projecting portion of said forward bogie arm and at the other end to a projecting portion of said rear bogie arm, the projecting portion of said rear bogie arm projecting in a direction generally opposite to that of the projecting portion of the forward bogie arm; and said curbside suspension system being staggered forward of the roadside suspension system.

4. A bogie action torsion bar suspension system as set forth in claim 3 wherein stop means is provided for each of the bogie arms to limit the bogie action of the suspension system.

5. A bogie action torsion bar suspension system as set forth in claim 3 wherein each of said trailing arms has a shock absorber connected thereto and to said frame to dampen out oscillations of the system.

6. A bogie action torsion bar suspension system as set forth in claim 3 wherein each of said torsion bars is so mounted relative to the bogie arm and the trailing arm as to be in simple torsion.

References Cited by the Examiner

UNITED STATES PATENTS

| 889,960 | 6/1908 | Palmer | 180—21 |
|---|---|---|---|
| 2,333,008 | 10/1943 | Holmstrom. | |

FOREIGN PATENTS

| 730,961 | 1/1943 | Germany. |
|---|---|---|
| 1,143,722 | 2/1963 | Germany. |

BENJAMIN HERSH, *Primary Examiner.*

P. GOODMAN, *Assistant Examiner.*